Nov. 25, 1947.   R. H. JORDAN   2,431,332
LATCH MECHANISM FOR APPLIANCES
Filed Dec. 31, 1943

INVENTOR.
Richard H. Jordan
BY
Hoodling and Frost
attys

Patented Nov. 25, 1947

2,431,332

UNITED STATES PATENT OFFICE 2,431,332

LATCH MECHANISM FOR APPLIANCES

Richard H. Jordan, Mansfield, Ohio, assignor to Dominion Electrical Manufacturing, Inc., a corporation of Ohio Application December 31, 1943, Serial No. 516,353

8 Claims. (Cl. 99—376)

My invention relates in general to a latch mechanism and more particularly to a latch mechanism for releasably fastening a plate to an appliance, such for example, as sandwich toasters and waffle irons.

My latch mechanism is particularly adaptable to an electrical appliance having exchangeable grill plates which may be conveniently and readily exchanged to convert a sandwich toaster into a waffle iron and vice versa.

An object of my invention is the provision of a latch mechanism which may be conveniently operated by a handle of the casing of the electrical appliance.

Another object of my invention is the provision of a latch mechanism which comprises a slidable latch member and a fixed latch member, in which the slidable latch member is actuated by the handle of the appliance.

Another object of my invention is the provision of a latch mechanism which is simple in construction and which is easy to operate.

Other objects and a fuller understanding of my invention may be had by referring to the following description and claims, taken in conjunction with the accompanying drawing, in which:

Figure 1:
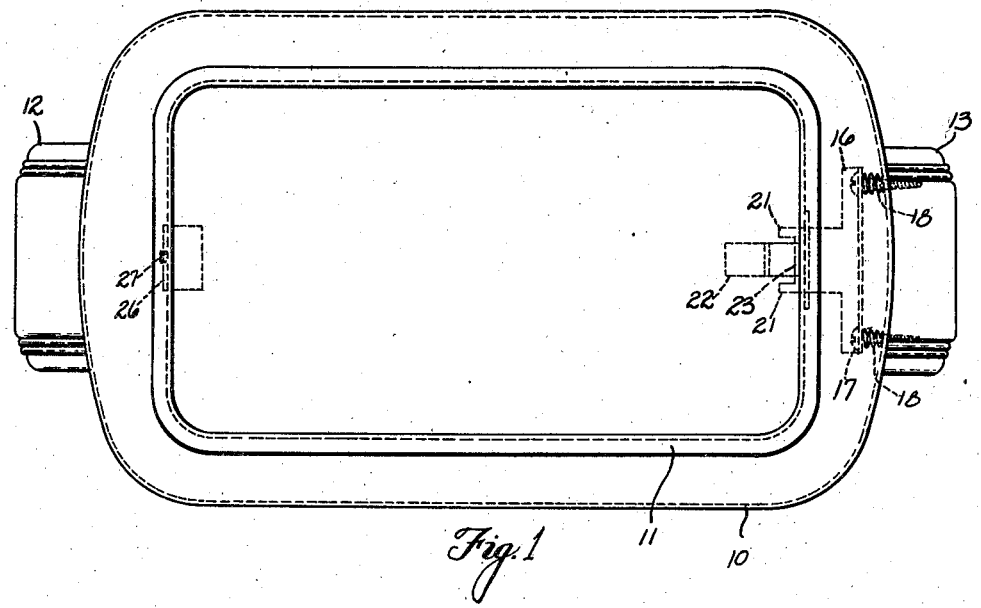
Figure 1 represents a plan view of an electrical appliance embodying the features of my invention.

With reference to the drawing, my latch mechanism is particularly adaptable to an electrical appliance indicated generally by the reference character 10, but it is to be understood that my invention may apply to electrical appliances or other devices of a different design and arrangement. The casing of the electrical appliance is provided with exchangeable grill plates to convert the electrical appliance into a sandwich toaster or into a waffle iron, or vice versa.

Figure 2:
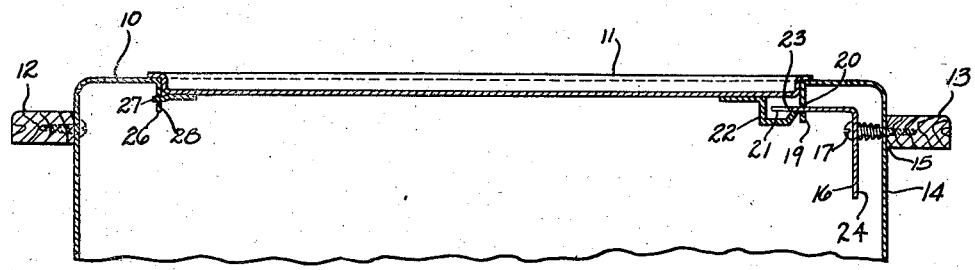
Figure 2 is a longitudinal cross-sectional view, taken along the longitudinal center of Figure 1.
Figure 4:
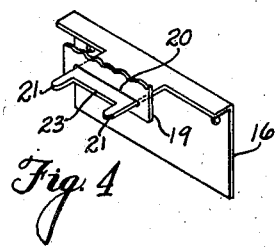
Figure 4 is a fragmentary and perspective view showing principally the slidable latch member and the guide means therefor.
Figure 3:
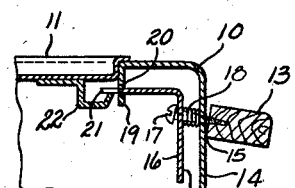
Figure 3 is a fragmentary view of the right-hand end portion of Figure 2, and shows the handle bent down to unlatch the slidable latch member from the fixed latch member.
Figure 5:
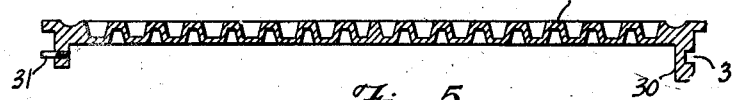
Figure 5 is a longitudinal cross-sectional view of a waffle plate which is arranged to be substituted for the grill plate illustrated in Figures 1, 2 and 3.

In Figures 1, 2 and 3 the casing is provided with a removable grill plate 11 and is exchangeable with the waffle iron plate 29 shown in Figure 5.

The casing is provided with a stationary handle 12 on one end thereof and a movable handle 13 upon the other end thereof. The movable handle is arranged to actuate a latch mechanism comprising generally a slidable latch member 16 which latches or engages a fixed latch member 22, which is connected to the underneath side of the removable grill plate 11. The slidable latch member 16 comprises a tongue 23 which slidably engages the fixed latch member 22 and a flanged portion 24 which is spaced from the inside of the side wall 14 of the casing. The tongue 23 of the slidable latch member 16 is arranged to slide in a guide member 19 having a guide slot 20 provided therein. The guide member 19 may be formed as an integral part of the casing. The sides of the tongue 23 are provided with forwardly extending guide ears 21 which remain within the guide slot 20 even when the slidable latch member 16 is moved to its unlatched position with respect to the fixed latch member 22. In the unlatched position, the tongue 23 is retracted to clear the fixed latch member 22 with the ears 21 still being guided in the guide slot 20. The springs 18 are disposed between the flanged portion 24 of the slidable latch member 16 and the inside wall 14 of the casing, whereby the tongue 23 of the slidable latch member is constrained to fit the fixed latch member 22 on the exchangeable grill plate 11. Extending through the springs 18 are screws 17 which fasten the movable handle 13 to the flanged portion 24 of the slidable latch member 16. The heads of the screws 17 engage the flanged portion 24, so that when the movable handle 13 is bent downwardly, the lower edge 15 of the movable handle 13 constitutes a fulcrum point or heel for retracting the slidable latch member 16 from engagement with the fixed latch member 22 for releasing the exchangeable grill plate 11. In Figure 3, while I have illustrated the movable handle 13 being bent downwardly, it is to be understood that the unlatching movement is effected equally as well when the movable handle 13 is bent upwardly, whereupon the upper top edge of the movable handle 13 constitutes a fulcrum point or heel for retracting the slidable latch member 16 to the unlatched position. Also, the unlatching engagement may be effected by grasping the handle 13 and pulling it laterally away from the outside wall 14 of the casing. The manner in which the movable handle 13 is operated to effect the unlatching engagement is determined by the convenience of the operator.

The opposite end of the grill plate 11 is provided with a fixed tongue or pin 27 which fits in a slot 28 of a downwardly extending flange 26 which is made integral with the appliance casing. Accordingly, after the right-hand end of the grill plate 11 is unlatched by actuation of the movable handle 13, the operator may readily remove the grill plate 11 by lifting it from the opening in the appliance casing, the lifting movement withdrawing the pin 27 from the slot 28 in the flange 26. The grill plate may be inserted in the casing in the reverse order. The grill plate 11 fits relatively close in the opening of the appliance casing which prevents lateral relative movement therebetween, so that the latch engagement may be effected upon movement of the slidable latch member 16.

The waffle iron plate 29 shown in Figure 5 is arranged to be exchangeable with the grill plate 11. The fixed latch 30 may be integrally cast with the waffle iron and is provided with a slot 32 into which the tongue 23 of the slidable latch member may engage to effect the latch engagement. The opposite end of the waffle iron plate 29 may be provided with a pin 31 which fits within the slot 28 of the flange 26 on the casing wall.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. Mechanism for releasably fastening a removable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement, a handle for said casing, said handle serving as a pickup handle for said appliance and as an operating handle for said releasing means, said handle being connected to the releasing means and being movable relative to the casing to operate the latch means, said handle having a face disposed adjacent said casing with edges of the face spaced from the connection between said releasing means and handle, whereby an edge of the handle serves as a fulcrum to produce a lever action when the handle is moved relative to said casing and thereby operate said releasing means, said plate fitting relatively close in the opening of the appliance for preventing lateral relative movement therebetween to effect the latch engagement.

2. Mechanism for releasably fastening a removable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement, a handle for said casing, said handle serving as a pickup handle for said appliance and as an operating handle for said releasing means, said handle being connected to the releasing means and being movable relative to the casing to operate the latch means, said handle having a face disposed adjacent said casing with edges of the face spaced from the connection between said releasing means and handle, whereby an edge of the handle serves as a fulcrum to produce a lever action when the handle is moved relative to said casing and thereby operate said releasing means, said plate fitting relatively close in the opening of the appliance for preventing lateral relative movement therebetween to effect the latch engagement, said latch means being mounted on the casing and disconnected from the plate to readily facilitate the removal of the unlatched plate from the casing.

3. Mechanism for releasably fastening a removable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement, a handle for said casing, said handle serving as a pickup handle for said appliance and as an operating handle for said releasing means, said handle being connected to the releasing means and being movable relative to the casing to operate the latch means, said handle having a face disposed adjacent said casing with edges of the face spaced from the connection between said releasing means and handle, whereby an edge of the handle serves as a fulcrum to produce a lever action when the handle is moved relative to said casing and thereby operate said releasing means, said plate fitting relatively close in the opening of the appliance for preventing lateral relative movement therebetween to effect the latch engagement, said latch means comprising a slidably mounted member having a portion spaced from the inside wall of the casing, resilient means urging the said portion away from the said inside wall to effect the latch engagement said resilient means opposing the movement of the handle relative to the casing in order that the appliance may be picked up by the handle without moving the handle relative to the casing and releasing the grill plate.

4. Mechanism for releasably fastening a removable grill plate in an opening of an appliance casing comprising, in combination, latch means mounted within the casing and making engagement between the plate and the casing to hold the plate in the casing, said latch means comprising two parts mounted respectively upon the casing and the plate, one of said parts comprising a slidable member and the other of said parts comprising a fixed member, said parts making a latching engagement with each other, said plate fitting relatively close in the opening of the appliance for preventing lateral relative movement therebetween to hold the latch part on the plate in substantially a fixed position relative to the latch part on the casing, a handle for the casing, said handle serving as a pickup handle for said appliance and as an operating handle for said slidable member, said handle being connected to the slidable member and being movable relative to the casing to operate the latch means, said handle having a face disposed adjacent said casing with edges of the face spaced from the connection between said slidable member and handle, whereby an edge of the handle serves as a fulcrum to produce a lever action when the handle is moved relative to said casing and thereby operate said slidable member.

5. Mechanism for releasably fastening a removable grill plate in an opening of an appliance casing comprising, in combination, latch means mounted within the casing and making engagement between the plate and the casing to hold the plate in the casing, said latch means comprising two parts mounted respectively upon the casing and the plate, one of said parts comprising a slidable member and the other of said parts comprising a fixed member, said parts making a latching engagement with each other, said plate fitting relatively close in the opening of the appliance for preventing lateral relative movement therebetween to hold the latch part on the plate in substantially a fixed position relative to the latch part on the casing, said slidable member having a flanged portion spaced from the inside wall of the casing, a spring between the flanged portion and said inside wall of the casing to urge the slidable member into engagement with the fixed member, a handle for said casing, said handle serving as a pickup handle for said appliance and as an operating handle for said slidable member, said handle being connected to the slidable member and being movable relative to the casing to operate the latch means, said handle having a face disposed adjacent said casing with edges of the face spaced from the connection between said slidable member and handle, whereby an edge of the handle serves as a fulcrum to produce a lever action when the handle is moved relative to said casing and thereby operate said slidable member.

6. Mechanism for releasably fastening a removable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement, a handle for said casing, said handle having a fulcrum portion fulcrumedly engaging the casing, said handle serving as a pickup handle for said appliance and as an operating handle for said releasing means, said handle being connected to the releasing means and fulcrumedly movable about said fulcrum portion against the casing to operate the latch means.

7. Mechanism for releasably fastening a removable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement, a conveyance pickup handle having a generally flat underside finger engageable surface whereby said appliance may be conveniently transported from place to place, said handle serving as an operating handle for said releasing means, said finger engageable surface terminating in a fulcrum portion next adjacent the casing, said handle being connected to the releasing means and fulcrumedly movable about said fulcrum portion against the casing to operate the latch means.

8. Mechanism for releasably fastening a movable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement, a handle carried by the said manually operable releasing means and disposed on the outside of said casing, said handle serving as a pick-up handle for said appliance and as an operating handle for said releasing means, said handle having a face portion disposed next adjacent said casing and a manually engageable portion disposed at an angle to the said face portion, said face portion and said manually engageable portion defining a fulcrum therebetween and about which the handle may be fulcrumedly moved against the casing to operate the manually operable releasing means, and resilient means effectively connecting said releasing means and said casing for urging the face portion of the handle against the casing to oppose fulcrum movement of the handle against the casing.

RICHARD H. JORDAN.

REFERENCES CITED

The following references are of record in the file of this patent:

UNITED STATES PATENTS

| Number | Name | Date |
|---|---|---|
| 2,188,757 | Moon | Jan. 30, 1940 |
| 2,009,792 | Uhl | July 30, 1935 |
| 2,117,579 | Smith | May 17, 1938 |
| 2,138,514 | Shoemaker | Nov. 29, 1938 |
| 2,059,821 | Spitalny | Nov. 3, 1936 |
| 2,334,012 | Koch et al. | Nov. 9, 1943 |
| 1,525,108 | Triggs | Feb. 3, 1925 |
| 1,137,078 | Nicodemus | Apr. 27, 1915 |